(12) United States Patent
Heckman et al.

(10) Patent No.: US 11,077,889 B2
(45) Date of Patent: Aug. 3, 2021

(54) TAILGATE HINGE CLIP

(71) Applicant: Ford Global Technologies, LLC, Dearborn, MI (US)

(72) Inventors: William George Heckman, Farmington Hills, MI (US); Vince Anthony Chimento, Plymouth, MI (US); Derek Matthew Poston, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 16/569,977

(22) Filed: Sep. 13, 2019

(65) Prior Publication Data
US 2021/0078646 A1    Mar. 18, 2021

(51) Int. Cl.
*B62D 33/027* (2006.01)
*B62D 33/03* (2006.01)
*B60J 10/86* (2016.01)
*B62D 33/02* (2006.01)

(52) U.S. Cl.
CPC .......... *B62D 33/0273* (2013.01); *B60J 10/86* (2016.02); *B62D 33/0207* (2013.01); *B62D 33/03* (2013.01)

(58) Field of Classification Search
CPC ... B60J 10/21; B60J 10/30; B60J 10/32; B60J 10/35; B60J 10/86; B62D 33/027; B62D 33/0273; B62D 33/0276; B62D 33/03; B62D 33/033
USPC .............. 296/50, 56, 57.1, 60; 49/479.1
See application file for complete search history.

(56) References Cited

U.S. PATENT DOCUMENTS

| | | | |
|---|---|---|---|
| 5,664,822 A | 9/1997 | Rosenfield | |
| 6,641,205 B1* | 11/2003 | Russell | B60J 5/0479 296/146.9 |
| 9,862,335 B2 | 1/2018 | Vu | |
| 10,040,341 B2* | 8/2018 | Ishikawa | B60J 10/25 |
| 10,300,777 B2 | 5/2019 | Marchlewski et al. | |
| 2008/0203752 A1* | 8/2008 | Warkentin | B62D 33/0273 296/57.1 |
| 2018/0290527 A1* | 10/2018 | Marchlewski | B60J 10/86 |

* cited by examiner

*Primary Examiner* — Dennis H Pedder
(74) *Attorney, Agent, or Firm* — David Coppiellie; Carlson, Gaskey & Olds, P.C.

(57) ABSTRACT

A disclosed tailgate hinge clip is mountable within a gap between a tailgate and a cargo bed and provides a surface for engaging a seal. The disclosed tailgate hinge clip includes a main body portion including a seal surface and a clip portion extending from the main body portion.

20 Claims, 5 Drawing Sheets

TAILGATE HINGE CLIP

TECHNICAL FIELD

This disclosure relates to vehicle tailgates and more particularly to a seal structure to plug gaps between a tailgate and sides of a cargo bed.

BACKGROUND

Vehicles with a cargo bed include a tailgate movable between open and closed positions on a hinge. Small gaps between sides of the cargo bed and the tailgate may allow water and dust into a cargo bed. A tonneau cover is often installed to keep water and dust outside the cargo compartment. Intrusion of water and dust into the cargo compartment with a tonneau cover is not desirable.

Vehicle manufactures continually seek improvements in cost and performance to maintain customer interest and satisfaction.

SUMMARY

A tailgate hinge clip according to an exemplary aspect of the present disclosure includes, among other things, a main body portion including a seal surface and a clip portion extending from the main body portion.

In a further non-limiting embodiment of the forgoing tailgate hinge clip, a mating surface on a back side of the main body portion is configured for attachment to a surface of a tailgate.

In a further non-limiting embodiment of any of the foregoing tailgate hinge clips, a support portion extending from the back side of the main body portion contacts a contoured surface of a tailgate.

In a further non-limiting embodiment of any of the foregoing tailgate hinge clips, the support portion comprises a plurality of ribs extending from the back side.

In a further non-limiting embodiment of any of the foregoing tailgate hinge clips, the plurality of ribs define a contoured contact surface.

In a further non-limiting embodiment of any of the foregoing tailgate hinge clips, the clip portion includes a lip that is configured to engage a hinge member supporting rotation of a tailgate.

In a further non-limiting embodiment of any of the foregoing tailgate hinge clips, the clip portion includes a riser portion that spaces the lip apart from the back side of the main body portion.

In a further non-limiting embodiment of any of the foregoing tailgate hinge clips, the seal surface comprises a generally triangular shape.

A tailgate seal assembly according to another non-limiting disclosed embodiment includes, among other things, a seal mountable to a surface of a cargo bed proximate a tailgate and a hinge clip attachable to the tailgate to provide a sealing surface engaged by the seal, the hinge clip including a main body portion including a seal surface that engages the seal when the tailgate is in a closed position and a clip portion extending from the main body portion that engages a portion of the tailgate to hold the clip to the tailgate.

In a further non-limiting embodiment of the foregoing tailgate seal assembly, the seal surface comprises a substantially triangular shape.

In a further non-limiting embodiment of any of the foregoing tailgate seal assemblies, the hinge clip includes a mating surface on a back side of the main body portion, the mating surface configured for attachment to a surface of a tailgate.

In a further non-limiting embodiment of any of the foregoing tailgate seal assemblies, a support portion extends from the back side of the main body portion for contacting a contoured surface of a tailgate.

In a further non-limiting embodiment of any of the foregoing tailgate seal assemblies, a bracket is secured to the tailgate and the clip portion includes a lip that engages the bracket.

In a further non-limiting embodiment of any of the foregoing tailgate seal assemblies, the tailgate includes a contoured corner and the support portion is received within a space between the contoured corner and the bracket.

In a further non-limiting embodiment of any of the foregoing tailgate seal assemblies, the clip portion includes a riser portion that spaces the lip apart from the back side of the main body portion.

The various features and advantages of this disclosure will become apparent to those skilled in the art from the following detailed description. The drawings that accompany the detailed description can be briefly described as follows.

DETAILED DESCRIPTION

Figure 1:
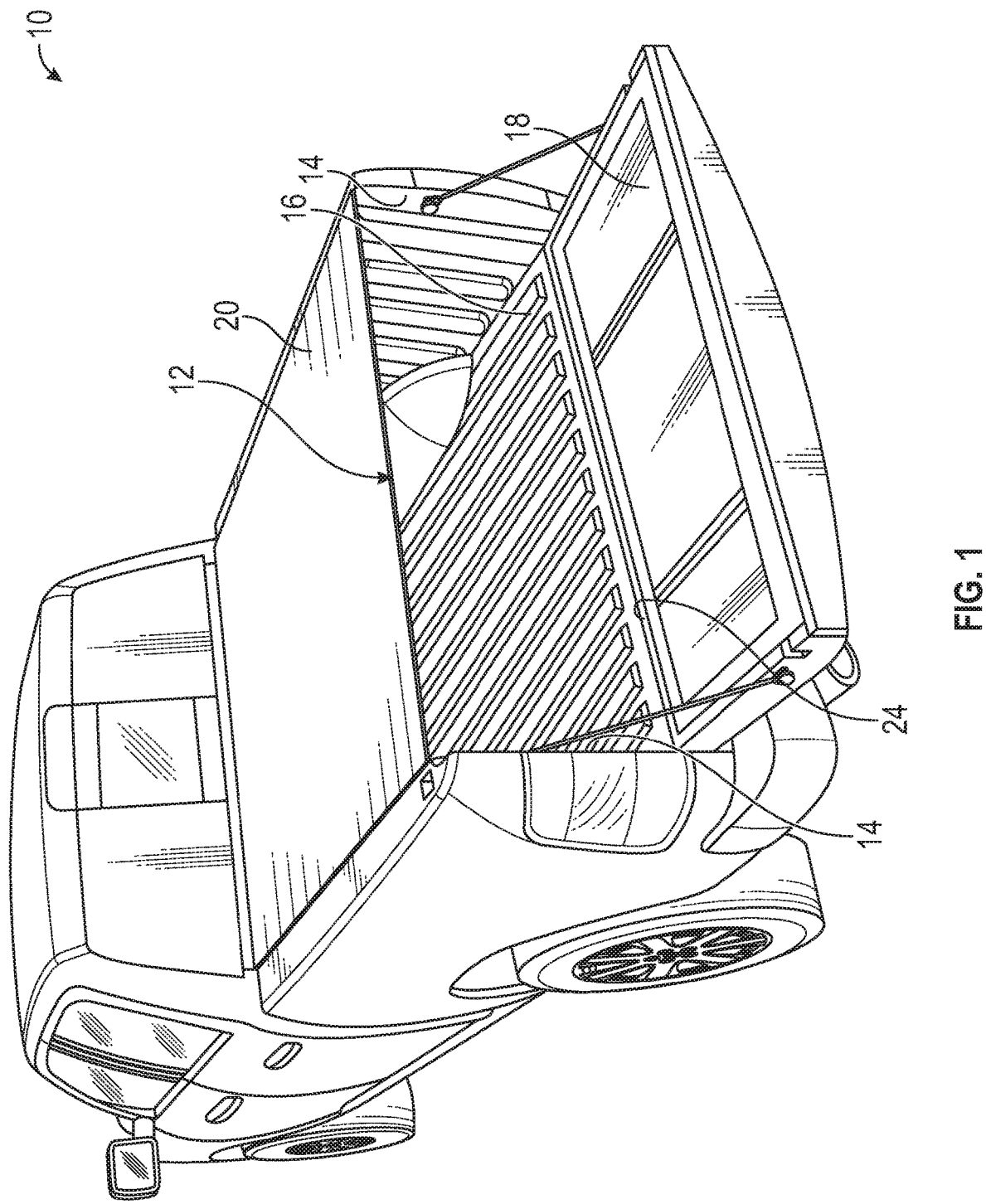
FIG. 1 is a perspective view of a cargo bed of a pickup truck.
Figure 2:
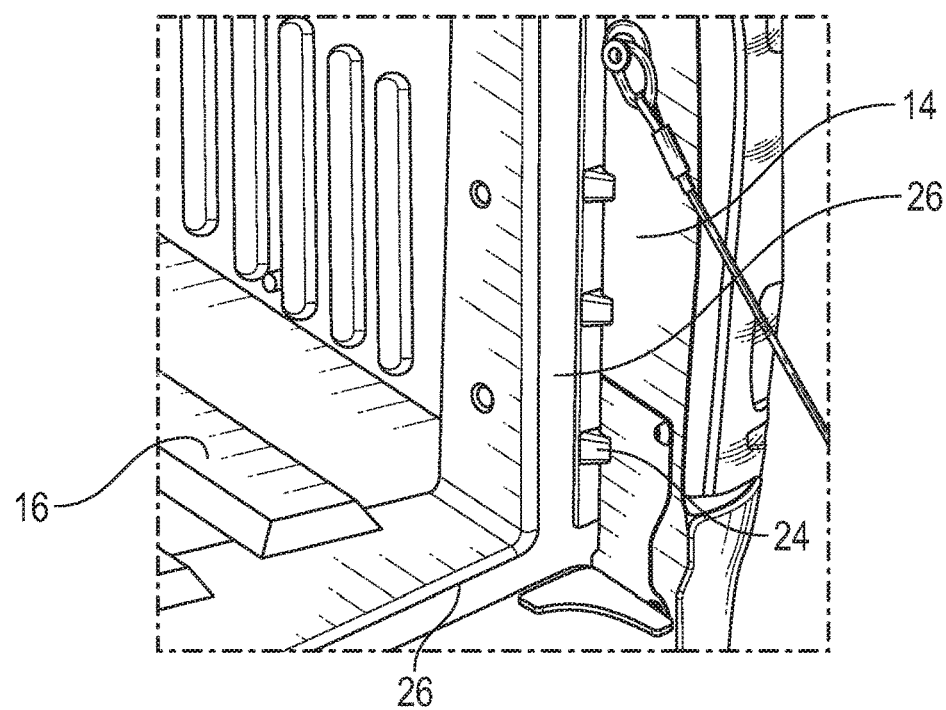
FIG. 2 is a perspective view of a portion of a cargo bed of a pickup truck.
Figure 3:
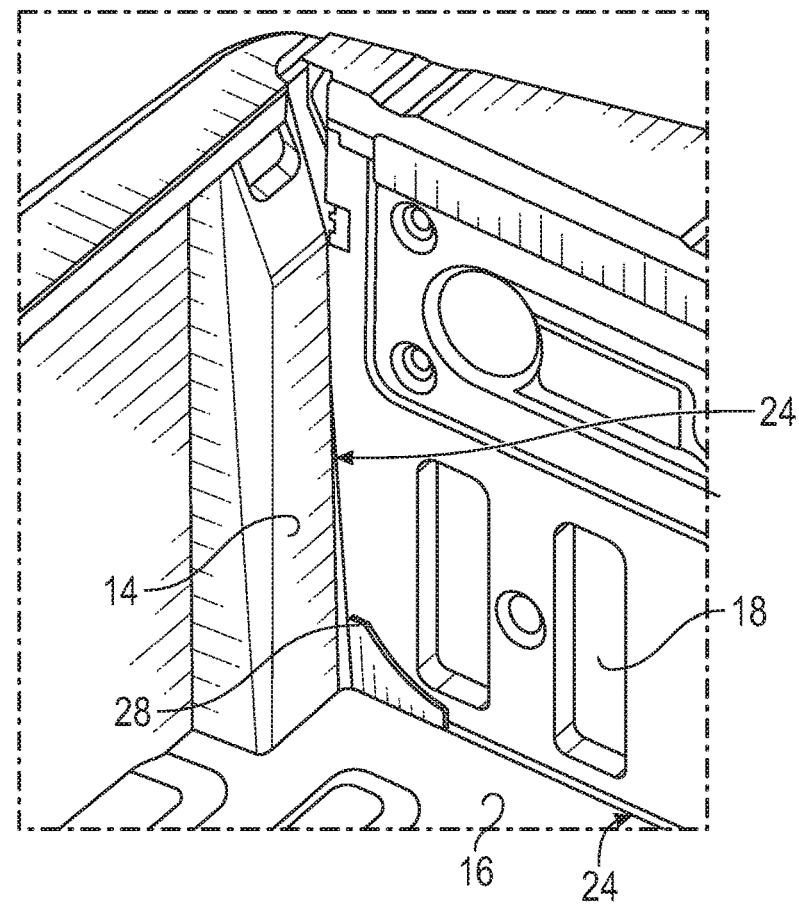
FIG. 3 is a perspective view of an inner corner portion of a cargo bed of a pickup truck with a tailgate in a closed position.

Referring to FIGS. 1, 2 and 3, a truck 10 includes a cargo bed 12 with sides 14, a bottom 16 and a tailgate 18. The tailgate 18 is movable between open and closed positions. A tonneau cover 20 is provided to prevent rain and dirt from entering the cargo bed. However, in some instances water and dirt may enter the cargo bed 12 through gaps 24 between the tailgate 18 and the sides 14 and a bottom 16 of the cargo bed 12. Accordingly, a seal 26 (FIG. 2) is provided to plug the gap 24 between the tailgate 18 and the sides 14 and bottom 16 of the cargo bed 12. The seal 26 operates by filling the gap 24 between the tailgate 18 and the cargo bed sides 14. The example tailgate 18 includes curved corners that do not align with the opposing portion of the cargo bed 12 and therefore do not engage the seal 26. A hinge clip 28 is mounted to the tailgate 18 at each inside corner (one hinge clip shown in FIG. 3) to provide a surface that aligns with the seal 26.

Figure 4:
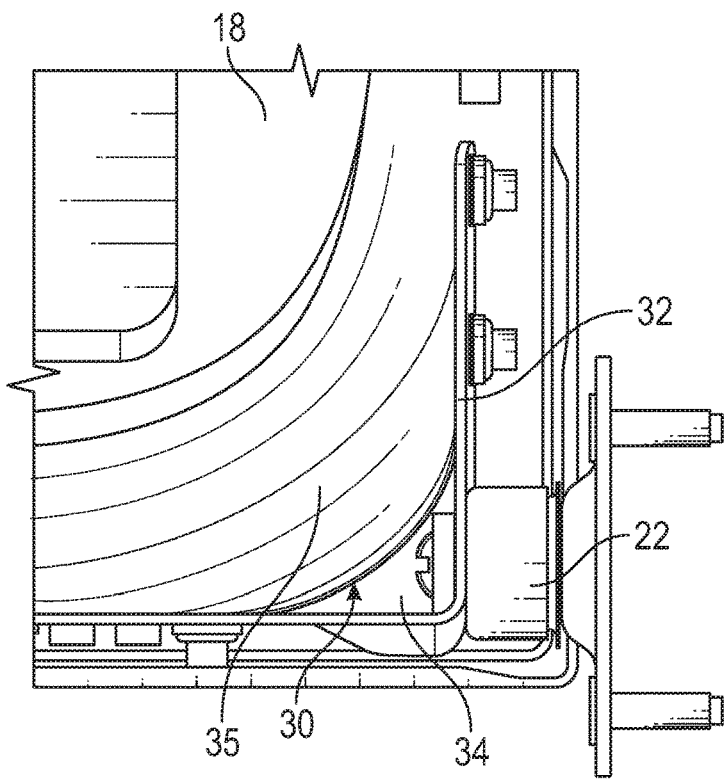
FIG. 4 is an enlarged view of a corner of an example tailgate.

Referring to FIG. 4 with continued reference to FIGS. 1, 2 and 3, the tailgate 18 includes a rounded corner 30. A bracket 32 is attached to the tailgate 18 to provide a connection to a hinge 22. The bracket 32 is "L" shaped to provide a substantially square corner. The combination of the "L" shaped bracket 32 and the rounded corner 30 of the tailgate generates an open space 34 therebetween. The open space 34 does not provide a surface that can interface with the seal 26. The hinge clip 28 fits within this space 34 to provide a sealing surface to interface with the seals 26 (Best shown in FIG. 3).

Figure 5:
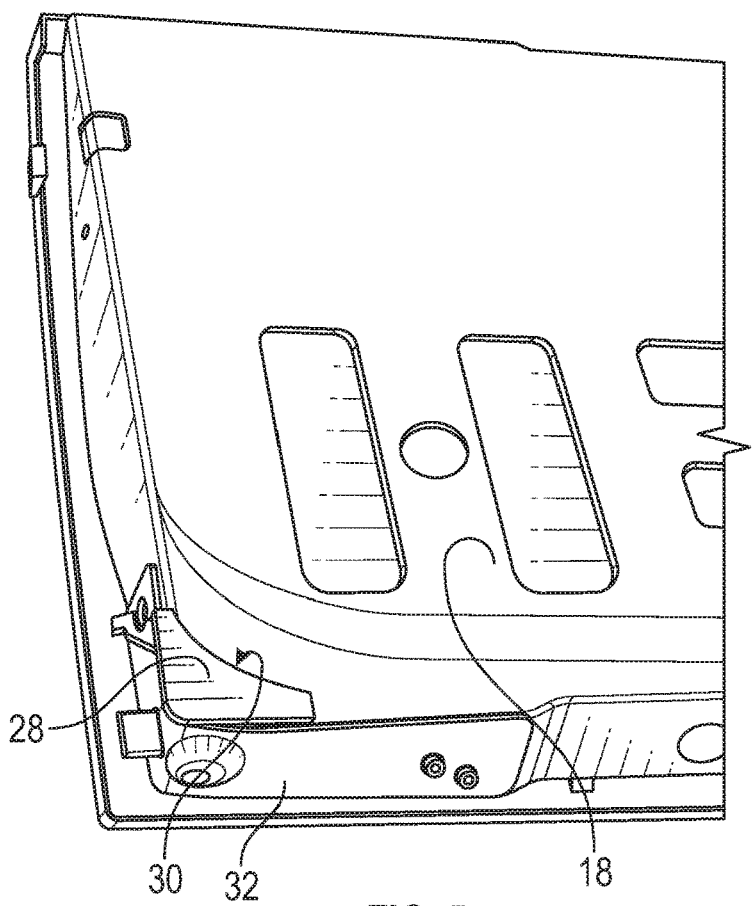
FIG. 5 is perspective view of a portion of an example tailgate including an example hinge clip embodiment.
Figure 6:
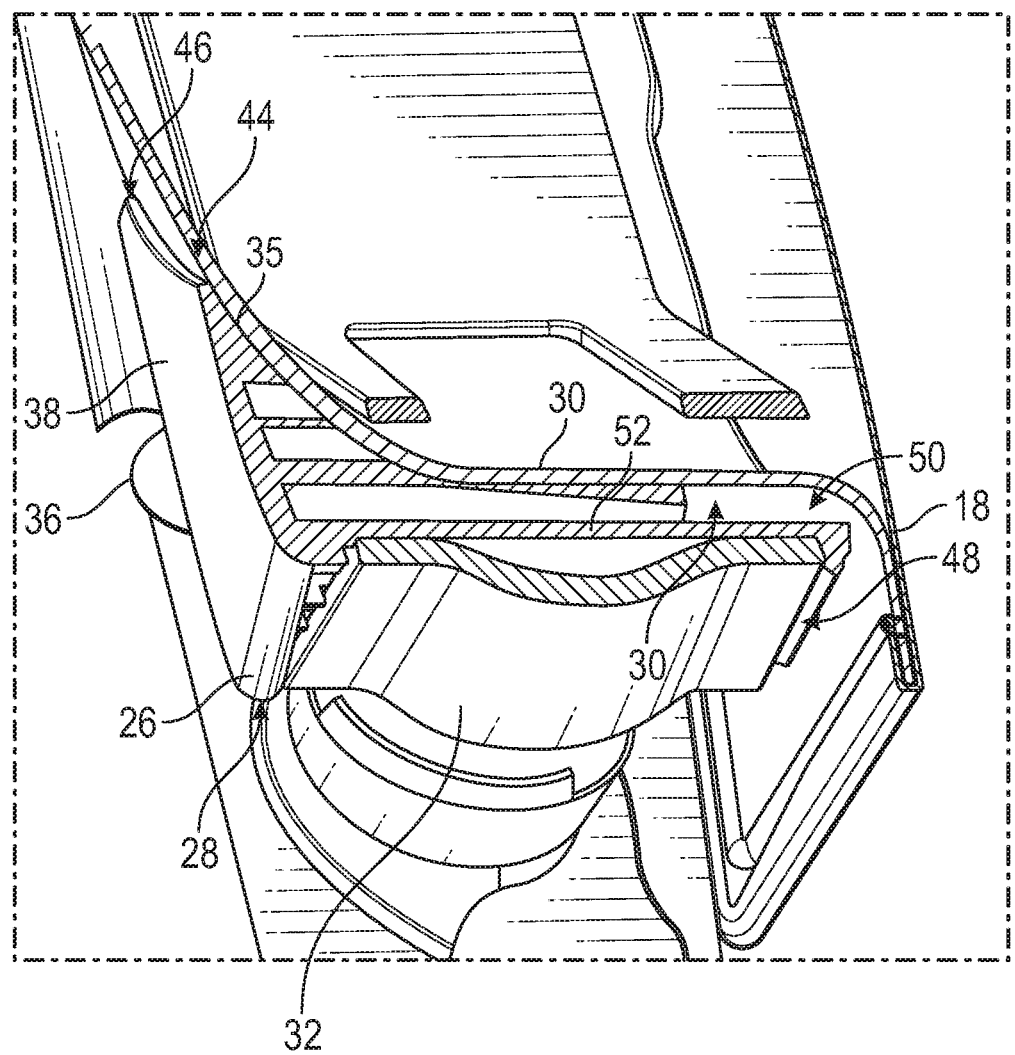
FIG. 6 is a cross-section of a portion of the tailgate including an example hinge clip.

Referring to FIGS. 5 and 6, the hinge clip 28 is shown mounted to the tailgate 18. The hinge clip 28 covers the open space 34 and provides an interface for the seal 26. The hinge clip 28 includes a main body portion 36 with a clip portion 50. The clip portion 50 extends from a back side 40 of the main body portion 36. The clip portion 50 engages one side of the bracket 32 to hold the hinge clip 28 in place. The clip portion 50 includes a lip 48 spaced from a main body 36 on a riser 52. The riser 52 extends from a main body portion 36 of the hinge clip 28 a distance that corresponds with the width of the bracket 32.

A portion of the hinge clip 28 overlaps a back surface 35 of the tailgate 18. In this disclosed embodiment, the overlapping portion is a mating surface 44 that abuts the back surface 35. The mating surface 44 is secured to the back surface 35 in one disclosed embodiment by an adhesive tape 46. The adhesive tape 46 holds the mating surface 44 against the back surface 35 and the clip portion 50 secures the hinge clip 28 within the open space 34.

Figure 7:
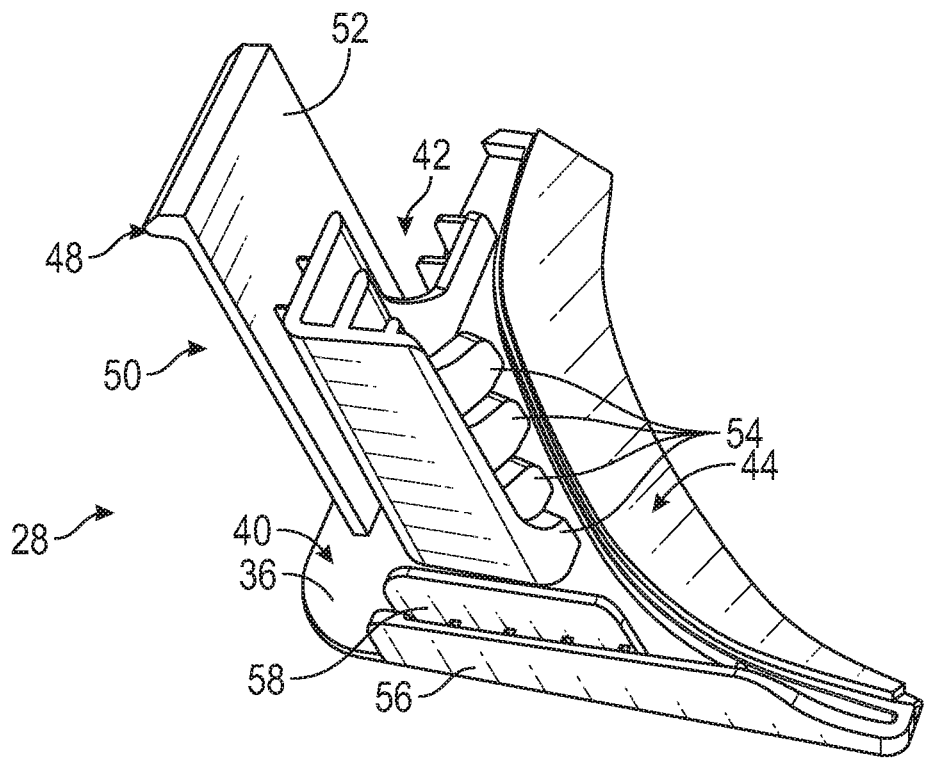
FIG. 7 is a perspective view of a back side of an example hinge clip embodiment.
Figure 8:
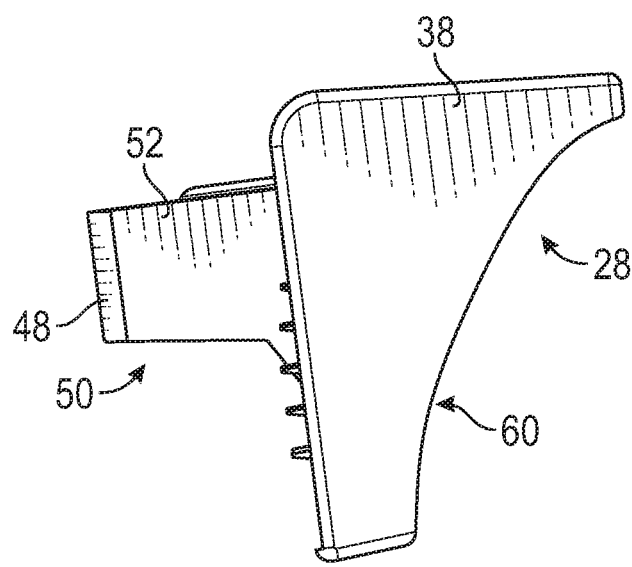
FIG. 8 is a perspective view of a front side of an example hinge clip embodiment.

Referring to FIGS. 7 and 8 with continued reference to FIGS. 5 and 6, the example hinge clip 28 further includes a support portion 42 that fills the open space 34 when installed. The example support portion 42 includes a plurality of ribs 54 that are contoured to cooperate with the contour of the corner 30 of the tailgate 18. The contoured shape provided by the ribs 54 aligns the hinge clip 28 within the open space 34 and provides a sturdy backing to resist bending deformation of the sealing surface 38. Alignment ribs 58 and 56 are also provided to abut portions of the bracket 32 and fix the hinge clip 28 to the tailgate 18. It should be appreciated that although a specific embodiment of the contour is reflected in the disclosed example, the support portion 42 could be structured differently to conform to other tailgate configurations.

The mating surface 44 is shown in FIG. 7 and is a contoured surface that conforms to the shape of the back surface 35 of the tailgate 18. The disclosed adhesive tape 46 (Best shown in FIG. 6) is double sided and applied to the mating surface 44. The combination of the mating surface 44 and the clip portion 50 provide a tight fit against the tailgate surface 35. The tight fit is provided by the length of the riser portion 52 that spaces the lip 48 from the main body portion 36 along with the support portion 42 that fits within the open space 34.

The seal surface 38 is substantially triangle shaped and includes a curved contour edge 60 that conforms to the shape of the back surface 35 of the tailgate 18. The seal surface 38 is discloses as being a smooth surface to provide desired sealing contact with the seals 26. The finish of the seal surface 38 is such that it does not disrupt the seal while providing a sturdy finish that is resistant to damage from impacts that may occur during use. Moreover, the sealing surface 38 is continuous to provide a continuous area to interface with the seal 26. The size of the sealing surface 38 is determined to provide sufficient room to accommodate differences in sizes and alignments due to different models and variations in all of the parts due to reasonable manufacturing tolerances.

The example hinge clip 28 is formed from a durable and impact resistant plastic material. The plastic material may be painted a desired color or molded in a desired color that corresponds with the vehicle color. The example hinge clip 28 is formed as a one piece integral part. Although disclosed as a one-piece part, it is also within the contemplation of this disclosure that the hinge clip 28 may be formed as separate parts. The example hinge clip 28 may be part of a kit including the seals 26 and tape 46 for assembly to a tailgate 18. Additionally, the hinge clip 28 may be differently configured for each of the two inside corners of the tailgate 18. As appreciated, the tailgate 18 may be differently formed at each of the inside corners. Accordingly, a kit for a specific vehicle may include differently configured left and right hinge clips 28. Each of the left and right hinge clips 28 would include the disclosed features with slight variations to accommodate the specific size and shape of the open space 34, bracket size and any other variations to accommodate the different configurations.

Accordingly, the example hinge clip 28 provides a sealing surface to align with a seal installed between a cargo bed and a tailgate to accommodate tailgate structures with curved and contoured corners.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tailgate hinge clip comprising:
   a main body portion including a seal surface; and
   a clip portion extending from the main body portion, wherein the clip portion includes a lip that is configured to engage a hinge member supporting rotation of a tailgate.

2. The tailgate hinge clip as recited in claim 1, including a mating surface on a back side of the main body portion, the mating surface configured for attachment to a surface of a tailgate.

3. The tailgate hinge clip as recited in claim 1, including a support portion extending from the back side of the main body portion for contacting a contoured surface of a tailgate.

4. The tailgate hinge clip as recited in claim 3, wherein the support portion comprises a plurality of ribs extending from the back side.

5. The tailgate hinge clip as recited in claim 4, wherein the plurality of ribs define a portion of a contoured contact surface.

6. The tailgate hinge clip as recited in claim 1, wherein the clip portion includes a riser portion that spaces the lip apart from the back side of the main body portion.

7. The tailgate hinge clip as recited in claim 4, wherein the seal surface comprises a generally triangular shape.

8. The tailgate hinge clip as recited in claim 1, wherein the main body portion and the clip portion are parts of a single unitary molded structure.

9. A tailgate seal assembly comprising:
- a seal mountable to a surface of a cargo bed proximate a tailgate;
- a hinge clip attachable to the tailgate to provide a seal surface engaged by the seal, the hinge clip is a single unitary integral structure that includes a main body portion including the seal surface that engages the seal when the tailgate is in a closed position and a clip portion extending from the main body portion that engages a portion of the tailgate to hold the clip to the tailgate; and
- a bracket secured to the tailgate and the clip portion includes a lip that engages the bracket.

10. The tailgate seal assembly as recited in claim 9, wherein the seal surface comprises a substantially triangular shape.

11. The tailgate seal assembly as recited in claim 9, wherein the hinge clip includes a mating surface on a back side of the main body portion, the mating surface configured for attachment to a surface of a tailgate.

12. The tailgate seal assembly as recited in claim 9, including a support portion extending from the back side of the main body portion for contacting a contoured surface of a tailgate.

13. The tailgate seal assembly as recited in claim 12, wherein the tailgate includes a contoured corner and the support portion is received within a space between the contoured corner and the bracket.

14. The tailgate seal assembly as recited in claim 13, wherein the clip portion includes a riser portion that spaces the lip apart from the back side of the main body portion.

15. A tailgate hinge clip comprising:
- a main body portion including a seal surface; and
- a clip portion extending from the main body portion, wherein the clip portion includes a riser portion that spaces a lip apart from the back side of the main body portion.

16. The tailgate hinge clip as recited in claim 15, including a contoured surface on a back side of the main body portion for contacting a contoured surface of a tailgate.

17. The tailgate hinge clip as recited in claim 16, including a plurality of ribs extending transversely from a back side of the main body.

18. The tailgate hinge clip as recited in claim 17, including at least one alignment rib configured to hold the tailgate hinge clip in a defined orientation relative to the tailgate.

19. The tailgate hinge clip as recited in claim 15, wherein the seal surface comprises a generally triangular shape.

20. The tailgate hinge clip as recited in claim 15, wherein the main body portion and the clip portion are parts of a single unitary molded structure.

* * * * *